United States Patent [19]

Weathers et al.

[11] Patent Number: 4,637,470

[45] Date of Patent: Jan. 20, 1987

[54] SUBSEA HYDRAULIC COUPLING

[75] Inventors: Gary G. Weathers; Billy J. Rice, both of Houston, Tex.

[73] Assignee: Hughes Tool Company, Houston, Tex.

[21] Appl. No.: 747,081

[22] Filed: Jun. 19, 1985

[51] Int. Cl.[4] .......................................... E21B 33/038
[52] U.S. Cl. ............................ 166/344; 137/614.04; 137/382
[58] Field of Search ............... 166/344, 341, 338, 345, 166/349; 137/614, 614.04, 382; 285/14, 45, 85, 316, 320, 340

[56] References Cited

U.S. PATENT DOCUMENTS

| 2,643,140 | 6/1953 | Scheiwer | 285/193 |
|---|---|---|---|
| 2,966,371 | 12/1960 | Bruning | 137/343 |
| 3,184,246 | 5/1965 | Kline | 277/168 |
| 3,207,524 | 9/1965 | Trbovich | 277/206 |
| 3,469,850 | 9/1969 | Jackson et al. | 277/83 |
| 3,527,480 | 9/1970 | Larson | 285/85 |
| 3,550,624 | 12/1970 | Johnson | 137/614 |
| 3,551,005 | 12/1970 | Brun | 166/341 X |
| 3,635,793 | 1/1972 | Kolb et al. | 176/87 |
| 3,777,771 | 12/1973 | De Visscher | 137/614.04 X |
| 4,269,226 | 5/1981 | Allread | 137/614 |
| 4,460,156 | 7/1984 | Hazelrigg et al. | 137/614.04 X |

FOREIGN PATENT DOCUMENTS 351464  2/1961  Czechoslovakia .................. 285/340

Primary Examiner—Stephen J. Novosad
Assistant Examiner—David J. Bagnell
Attorney, Agent, or Firm—James E. Bradley

[57] ABSTRACT

A hydraulic connector assembly is particularly adapted for use in subsea well installations. The connector assembly includes a female support member and a male support member, each carrying a connector. Each connector has a bore through it and a check valve that opens when the connectors are brought together. A resilient metal seal ring located in the female connector provides primary sealing. Belleville washers are located between the male connector and its support member. The washers deflect, allowing the entire male connector to move downwardly as the support members are brought together to provide a force to maintain the connectors in contact with each other.

5 Claims, 4 Drawing Figures

SUBSEA HYDRAULIC COUPLING

BACKGROUND OF THE INVENTION

1. Field of the Invention

This invention relates in general to subsea well systems, and in particular to a hydraulic coupling for connecting hydraulic lines in a subsea well environment.

2. Description of the Prior Art

Subsea well systems in deep water have numerous hydraulic controls for opening and closing valves in connection with the production of the oil. When repair to the well is needed, hydraulic lines must be switched from the production to the workover mode. In this case, different hydraulic connections may be required.

The hydraulic connector assemblies in a subsea well system may have a stationary member that remains with the subsea well apparatus for many years. There may be a large number of these stationary connectors located in a bundle. A retrievable connector assembly or pod is lowered to the subsea floor for engaging the stationary connectors to connect and reconnect hydraulic lines.

The hydraulic line connections must be able to withstand high pressure for in some cases extensive time periods. Stationary connectors, for example, may be required to remain undersea for 20 years without maintenance. Some prior connector assemblies provide metal to metal seals because of the extreme conditions. Normally, the metal seal connectors have a portion that crushes under high force to accomplish the sealing. The high energizing force may require special equipment. Also, the connection cannot be reused.

SUMMARY OF THE INVENTION

The hydraulic connector assembly of this invention includes a female connector and a male connector. Each connector has a bore extending through it with a check valve member located therein. The check valve member is urged to the closed position by a spring. A resilient metal seal ring is located in the bore of the female connector before being engaged by the mandrel of the male connector. The male connector is preferably mounted to a stationary support member by means of a series of Belleville washers mounted opposed to each other to form a spring. When the female connector assembly is pressed onto the male connector, the Belleville washers deflect to provide a force to keep the male in tight contact with the metal seal.

DESCRIPTION OF THE PREFERRED EMBODIMENT

Figure 1:
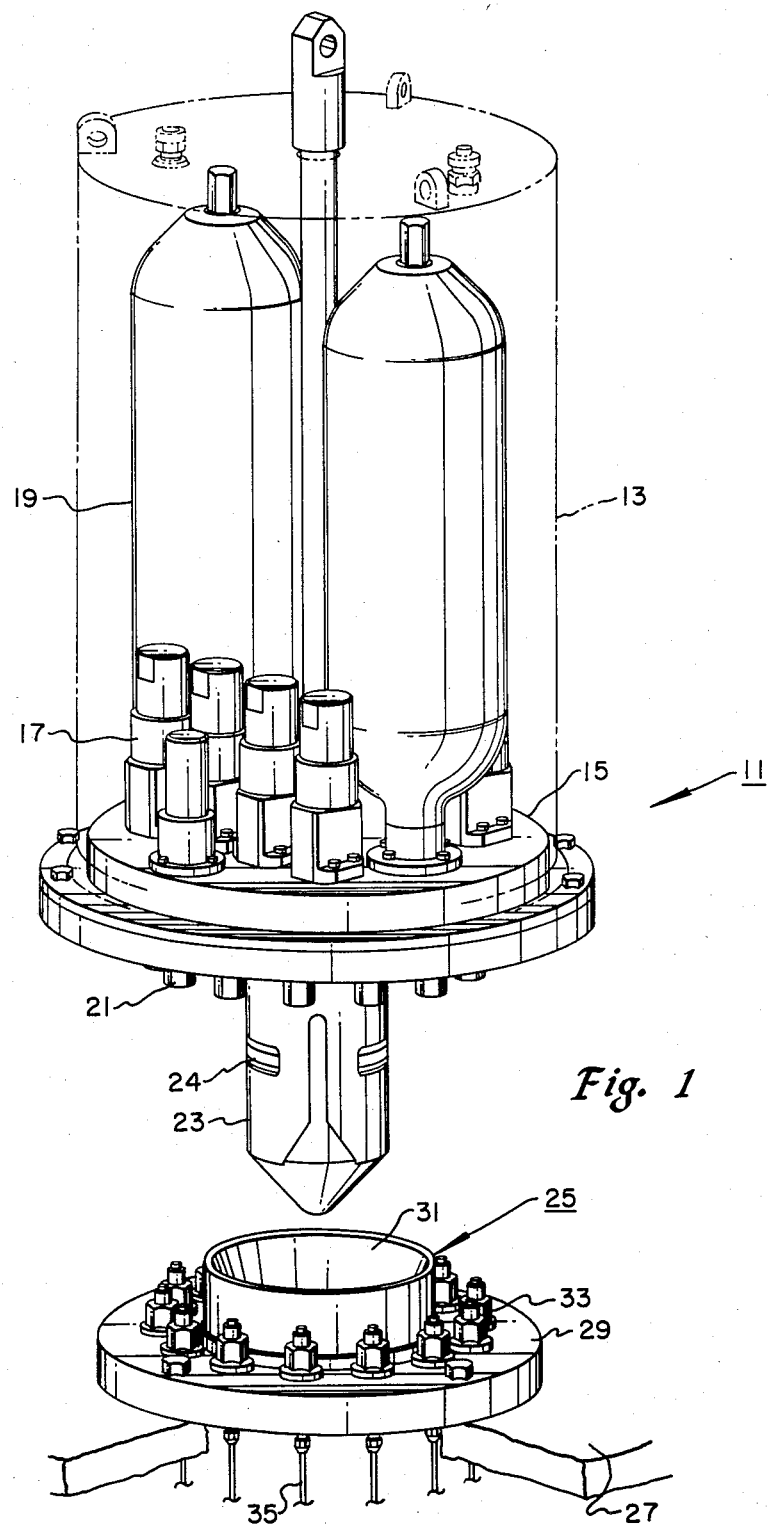
FIG. 1 is a perspective view of a retrievable connector pod being lowered onto a bundle of stationary male connectors mounted to a subsea well apparatus.

FIG. 1 shows one type of use for which the hydraulic connectors of this invention may be applied. The subsea hydraulic connector assembly 11 includes a retrievable pod 13. The pod 13 is adapted to be raised and lowered remotely in very deep water. Pod 13 includes a laminated manifold 15 mounted on a base plate 16. Manifold 15 has internal ports and passages (not shown) for connecting hydraulic fluid to pilot valves 17. A pair of accumulators 19 are used in a conventional manner. A plurality of female connectors 21 are mounted to the lower side of the base plate 16. The pod 13 has a latching mechanism 23 with dogs 24 that are expansible by means of an internal mechanism (not shown) actuated hydraulically or mechanically.

A subsea well apparatus 27 will have a stationary receptacle 25 mounted to it. Receptacle 25 has a support plate 29. A latch receptacle 31 is located in the center plate 29 for receiving latching mechanism 23. A plurality of male connectors 33 are mounted to support plate 29. Each connector 33 is connected to a hydraulic fluid line 35 for the passage of hydraulic fluid. The connectors 21 and 33, when connected together, provide a continuously open line between hydraulic lines 35 and the pilot valves 17. The dogs 24 will engage a shoulder (not shown) inside the receptacle 31 to tightly clamp the pod 13 to the stationary receptacle 25.

Figure 2:
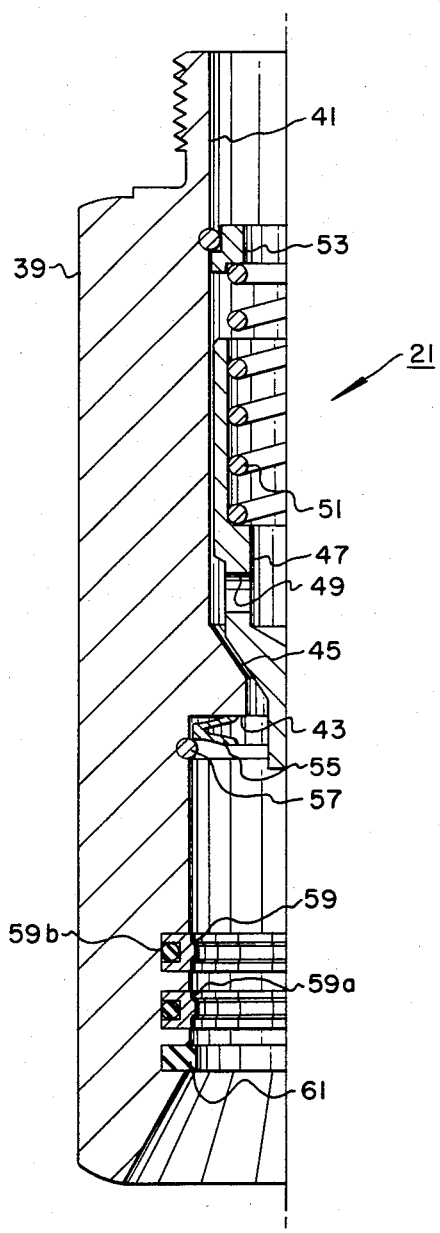
FIG. 2 is an enlarged, partial sectional view of one of the female connectors.
Figure 4:
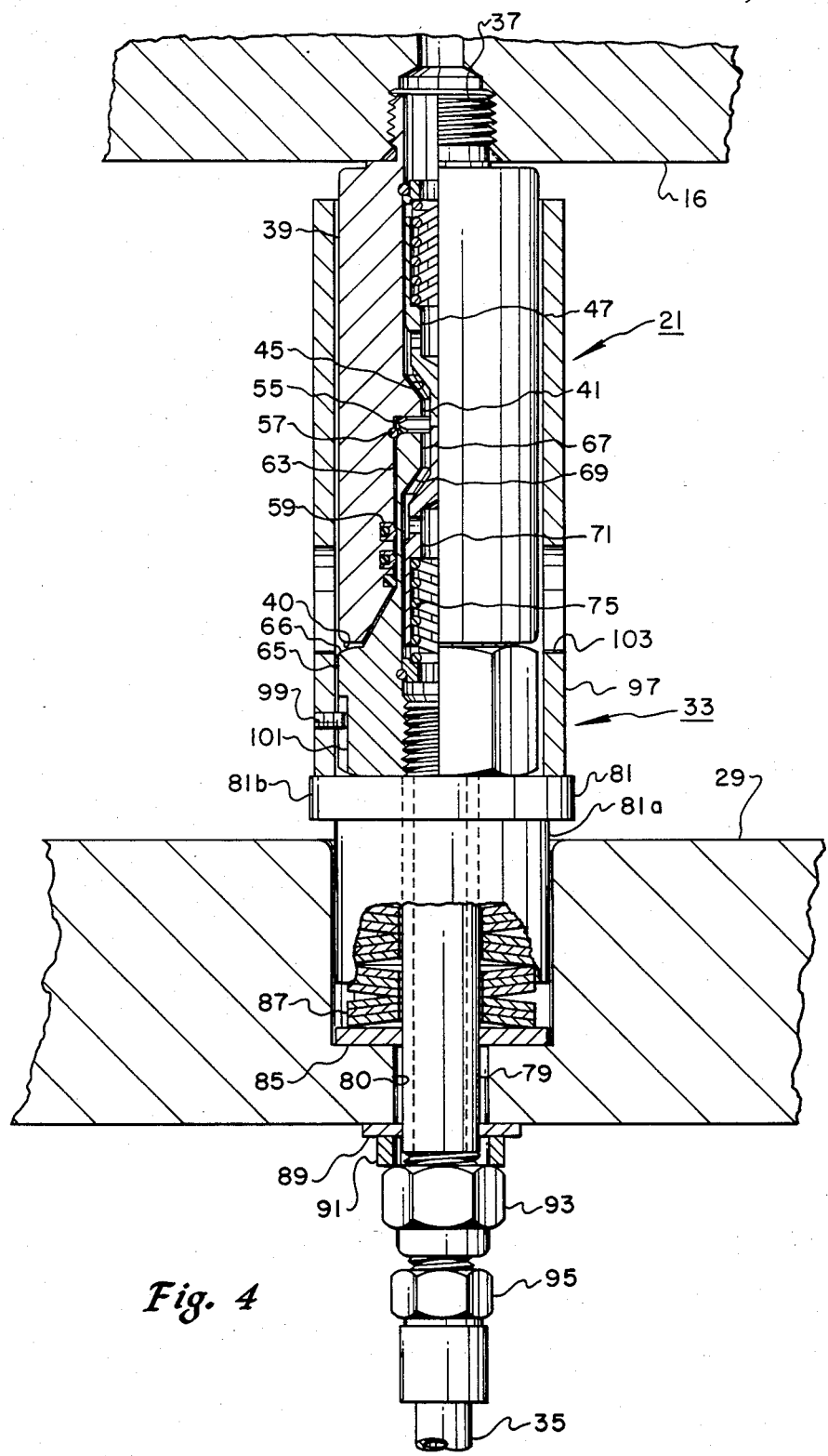
FIG. 4 is a sectional view of a set of the connectors in an assembled postion and showing also a shield that optionally may be used around the male connector.

Referring briefly to FIG. 4, each female connector 21 has a threaded upper end for engaging a threaded hole 37 formed in the plate 16, which communicates with manifold 15. Threaded hole 37 communicates within the pilot valve 17 (FIG. 1). Referring now to FIG. 2, each female connector 21 includes a housing 39. Housing 39 has a lower rim 40 and an axial bore 41 extending through housing 39. A downwardly facing shoulder 43 is formed in bore 41 about midway along its length. Immediately above shoulder 43, an upwardly facing seat 45 is formed. Seat 45 is conical. A check valve member 47 has a conical portion that mates with the seat 45 to close the bore 41 to hydraulic fluid when in the closed position shown in FIG. 2. Check valve member 47 has several holes 49 through its sidewall that allows the passage of hydraulic fluid when the check valve member 47 is moved upwardly to the open postion as shown in FIG. 4. A coiled spring 51 serves as spring means for urging the check valve member 47 downwardly to the closed position. Coiled spring 51 is held in place by a retainer 53 located in the bore 41.

The primary sealing is handled by a resilient metal seal ring 55. Seal ring 55 is of a type having two lips that face inwardly, defining a general "V" shape. The lips deflect a slight amount, but do not permanently deform, when the seal is energized to provide the necessary sealing. Ring 55 is held in place by a retainer 57, which is an elastomeric member secured within a groove formed in the bore 41. The upper lip of ring 55 is adapted to contact the shoulder 43.

A pair of elastomeric seals 59 serve as secondary seal means. Elastomeric seals 59 are located in bore 41 downwardly from the ring 55. Each elastomeric seal 59 has a seal ring 59a which contains an annular channel. An O-ring 59b is carried within the channel, forming a composite ring. Both the O-ring 59b and the seal ring 59a are elastomeric. A Teflon wiper ring 61 is located below the lowermost elastomeric seal 59.

Figure 3:
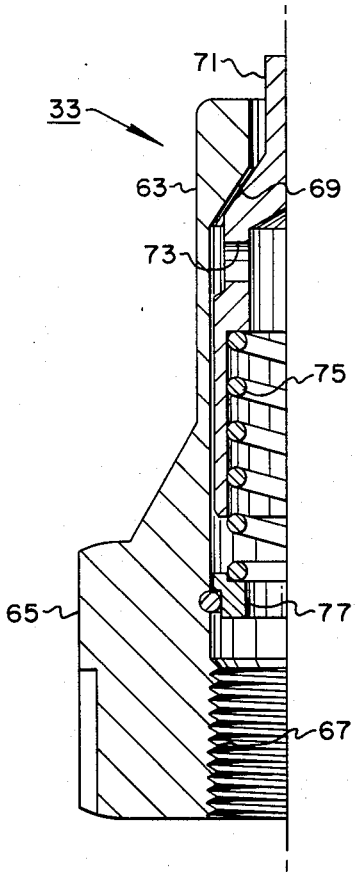
FIG. 3 is an enlarged partial sectional view of one of the male connectors.

Referring now to FIG. 3, the male connector 33 includes a mandrel 63. Mandrel 63 is adapted to be closely received in the bore 41, with the upper end of mandrel 63 contacting the metal seal ring 55 to cause it to deflect and provide sealing. Mandrel 63 has a base 65 that is of larger diameter. An external shoulder 66 is located on the upper end of base 65. A bore 67 extends through the mandrel 63 and base 65 for communicating hydraulic fluid. Bore 67 also has a seat 69, however seat 69 faces downwardly. Seat 69 is conical for receiving a check valve member 71. Check valve member 71 is identical to the check valve member 47. It has holes 73 in its sidewall for allowing the passage of hydraulic fluid when the check valve member 71 is pushed downwardly from the closed position as shown in FIG. 3 to the open position shown in FIG. 4. A coiled spring 75 urges the check valve member 71 upwardly to the closed position. Spring 75 is secured by a retainer 77 located in the bore 67. Each check valve member 47 and 71 has a protruding central portion that contacts the other to cause them to move to the open positions when the male and female connectors 33 and 21 are brought together.

Referring now to FIG. 4, mandrel 63 includes a rigid conduit or nipple 79, which is screwed into threads formed in the bore 41 in base 65. Nipple 79 extends downwardly through a hole 80 formed in the support plate 29. A collar 81 (shown partially broken away) will slide loosely over the nipple 79 to contact the bottom of the base 65. Collar 81 has a lower portion 81a that is adapted to be received within a counterbore 83 formed in the hole 80 in the support plate 29. The lower portion 81a will slide freely within the counterbore 83. Collar 81 also has an upper flange 81b which is of a larger diameter than the counterbore 83. Lower portion 81a has a cylindrical, axial bore or cavity, with an upper downwardly facing surface.

A flat metal washer 85 is positioned for contact with the base of counterbore 83. A plurality of Belleville washers 87 are located between the downwardly facing surface of collar 81 and the washer 85. Some of the washers 87 will be in the cavity of collar 81. The Belleville washers 87 are frustoconical resilient metal members that are slidingly received on the nipple 79. The Belleville washers 87 are arranged with some of them having opposed apexes to others, so that they can be deflected to provide a spring force. In the embodiment shown in FIG. 4, the Belleville washers 87 are arranged in groups of three with their apexes facing one direction and in contact with another three with their apexes facing in the opposite direction.

A flat washer 89 and a spacer 91 are located below the support plate 29. Washer 89 is of a larger diameter than the lower portion of passage 80. A nut 93 engages threads on the nipple 79 and bears against the spacer 91. Tightening nut 93 snuggly causes the nipple 79 to move downwardly, bringing along with it the collar 81, to snuggly retain the Belleville washers 87. Normally nut 93 will not be tightened enough to compress the washers 87 prior to the connectors 21 and 33 being joined. A conventional pipe coupling 95 is connected to the threads at the lower end of the nipple 79. Pipe coupling 95 is connected to the hydraulic line 35.

In the embodiment of FIG. 4, an optional shield 97 is shown. Shield 97 can be used where there is some danger of damage to the mandrel 63 due to misalignment of a heavy support member to which the female connectors 21 might be secured, rather than the lightweight pod 13. Shield 97 is a sleeve that is secured by means of a set screw 99 extending through the sidewall and engaging milled slot 101 in the base 65. Four large holes 103 are located in the sidewall of the shield 97 to allow sea-water to be displaced when the connection is made. Holes 103 extend to a point below the top of base 65. Shield 97 receives the housing 39 in a fairly loose fit, and extends to almost the top of housing 39 when the connectors 21 and 33 are connected together as shown in FIG. 4.

In operation, as shown in FIG. 1, the female assembly or pod 13 will be lowered downwardly, with the latch mechanism 23 inserting into the receptacle 31. Guides (not shown) on the latching mechanism 23 and receptacle 31 will orient the female connectors 21 so that they are vertically aligned with the male connectors 33. Once the latching mechanism 23 is inside of the receptacle 31, the dogs 24 are actuated to extend outward and tightly draw the manifold 15 toward the support plate 29.

Referring to FIG. 4, when the female connector 21 inserts over the male connector 33, the check valve members 47 and 71 will move to the open position as shown in FIG. 4. Initially, the shoulder 66 will not be in tight contact with rim 40. Further downward movement causes the upper end of the mandrel 63 to contact the metal seal 55 and cause it to deflect slightly. The Belleville washers 87 will deflect slightly and the flange 81b will move downward a short distance toward the upper side of the support plate 29. The downward movement is preferably only about 0.004-0.008 inches. Nipple 79 and coupling 95 move downwardly in unison with the mandrel 63 and collar 81. Flange 81b will normally not contact the plate 29 when the manifold 15 is fully secured to the plate 29. The Belleville washers 87 will exert an upward force of preferably 200 to 300 pounds, maintaining the seal ring 55 in tight contact. The shoulder 66 and rim 40 will contact each other, preventing any additional movement of the mandrel 63 upwardly against the seal ring 55. Even if flange 81b contacted plate 29 and additional force was exerted on the connectors 21 and 33, the mandrel 63 would be unable to further deflect the seal ring 55 because of the contact of shoulder 66 and rim 40. Hydraulic fluid will now be able to flow through the connector bores 41 and 67. Fluid pressure will tend to expand the lips of seal ring 55 further outward, maintaining a tight seal.

If it is desired to disconnect the connectors, the dogs 24 (FIG. 1) are retracted and the pod 13 is lifted. As the male and female connectors 21 and 33 disengage, the check valve members 47 and 71 move to the closed positions. Reconnection can be made by repeating the above operation. The metal seal 55 is sufficiently resilient to be reused many times. The Belleville washers 87 do not permanently deform under the deflection.

The invention has significant advantages. The connection provides a high pressure seal of long life. The Belleville washers do not fatigue with long use. The metal seal does not permanently deform, thus the connection can be made repeatedly. The Belleville washers do not permanently deform, allowing reconnection. There are no seals on the lower member that might require servicing. The female connectors are light in weight and simple in structure, allowing the pod to be moved by remote control. The shield protects the mandrel in case the female connectors are part of a large component that might otherwise damage the mandrels if misaligned. The metal seal ring cannot be harmfully crushed by excessive force because of the limit of the movement of the male connector into the female connector.

While the invention has been shown in only one of its forms, it should be apparent to those skilled in the art that it is not so limited but is susceptible to various changes without departing from the scope of the invention.

I claim:

1. In a hydraulic connector assembly of the type having first and second support members for carrying respectively a first connector and a second connector which telescopingly mate to form a hydraulic connection, each connector having an axial bore with a seat and a check valve member for movement between an open position when the connectors are in contact with each other, allowing hydraulic fluid flow, to a closed position when the connectors are apart from each other, blocking hydraulic fluid flow, the check valve members being urged into the closed position by spring means, the improvement comprising in combination:

metal seal means actuable by axial deflection and carried by one of the connectors for sealing the axial bores to each other;

an external flange located on the first connector;

the first connector having conduit means extending through a hole in the first support member and adapted to be connected to a hydraulic fluid line for the delivery of hydraulic fluid, the first connector and conduit means being moveable in unison with each other and with respect to the first support member; and bias means for urging the connectors together to maintain the seal means in axial deflection, the bias means comprising a plurality of frusto-conical washers encircling the conduit means between the flange and the first support member, so that when the support members are brought together, the first connector and the conduit means will move a slight distance relative to the first support member, deflecting the frusto-conical washers to apply a force to the connectors to maintain them tightly together.

2. A hydraulic connector assembly, comprising in combination:

a female support member;

a female connector carried by the female support member, the female connector including a housing having an axial bore with a downwardly facing shoulder and spaced above the shoulder an upwardly facing seat located therein;

a female check valve member carried in the female connector bore for movement between a closed position in contact with the seat to prevent flow of hydraulic fluid through the female connector bore, to an open position away from the seat, allowing flow of fluid through the female connector bore;

spring means for urging the female check valve member into the closed position;

a resilient metal seal ring carried immediately below the shoulder;

a male support member;

a male connector carried by the male support member, the male connector including a mandrel having a bore therethrough for the passage of hydraulic fluid, the bore having an upwardly facing seat, the mandrel having an external flange located thereon, the mandrel being axially moveable with respect to the male support member, the mandrel further having an upper end adapted to contact and axially deflect the seal ring;

conduit means extending through the male support member, having a lower end connected to a hydraulic fluid line and an upper end connected to the mandrel, the conduit means being axially moveable in unison with the mandrel with respect to the male support member;

a male check valve member carried in the mandrel bore for movement between a closed position in contact with a seat in the mandrel bore to prevent flow of hydraulic fluid, to an open position in contact with the female check valve member and spaced from the seat, allowing flow of hydraulic fluid through the mandrel bore;

spring means for urging the male check valve member into the closed position; and a plurality of frusto-conical washers encircling the conduit means between the flange and the male support member, the washers being oriented to form a spring, so that the support members are brought together to insert the mandrel into the housing, the mandrel and conduit means will move in unison downwardly a slight distance with respect to the male support member, deflecting the frusto-conical washers to apply a force to the mandrel to maintain the mandrel upper end in tight contact with the seal ring.

3. A hydraulic connector assembly, comprising in combination:

a female support member;

a female connector carried by female support member, the female connector including a housing having an axial bore with a downwardly facing shoulder and an upwardly facing seat located above the shoulder;

a female check valve member carried in the female connector bore for movement between a closed position in contact with the seat to prevent flow of hydraulic fluid through the female connector bore, to an open position away from the seat, allowing flow of fluid through the female connector bore;

a spring means for urging the female check valve member into the closed position;

a resilient metal seal ring having a pair of inwardly facing lips carried immediately below the shoulder;

a male support member;

a male connector carried by the male support member, the male connector including a mandrel having a bore therethrough for the passage of hydraulic fluid, the bore having an upwardly facing seat, the mandrel adapted to be received within the housing and having an upper end adapted to contact and axially deflect the seal ring;

a male check valve member carried in the mandrel bore for contact with the female check valve member for movement between a closed position in contact with the seat in the mandrel bore to prevent flow of hydraulic fluid, to an open position away from the seat, allowing flow of hydraulic fluid through the mandrel bore;

a spring means for urging the male check valve member into the closed position; and bias means for urging the upper end of the mandrel against the seal ring, the bias means comprising a plurality of frusto-conical washers mounted between one of the connectors and its support member, so that when the support members are moved together, the frusto-conical washers will deflect and apply a force to maintain the upper end of the mandrel tightly against the seal ring.

4. In a hydraulic connector assembly of the type having female and male support members, each for carrying respectively a female and male connector, each connector having a bore therethrough for the passage of fluid, each connector having a check valve member located therein for movement between a closed position when the connectors are apart to prevent the flow of fluid, to an open position when the connectors are in contact with each other for allowing the passage of fluid through the bores, and spring means for urging the check valve members to the closed position, the improvement comprising in combination:

- a downwardly facing shoulder located in the bore of the female connector;
- a resilient metal seal ring carried in the bore of the female connector directly below the shoulder;
- a mandrel located in the male connector having an upper end adapted to contact and axially deflect the seal ring against the shoulder;
- a plurality of frusto-conical washers located between the mandrel of the male connector and the male support member;
- coupling means for connecting the male connector to a hydraulic fluid line;
- the male connector mandrel and coupling means being moveable downwardly in unison relative to the male support member when the support members are brought together, causing the frusto-conical washers to deflect to apply a force to maintain the mandrel upper end tightly against the seal ring;
- a sleeve carried by the male support member and enclosing the male connector, the sleeve having a smooth inner diameter sized to telescopingly receive the female connector within when the support members are brought together; and
- port means in the sidewall of the sleeve for purging the sleeve of any liquid when the female connector is being inserted into the sleeve.

5. A subsea hydraulic connection assembly comprising in combination:

- a female support member adapted to be lowered into the sea;
- a plurality of hydraulic female connectors mounted to the lower side of the female support member, each protruding downwardly, each female connector including a housing having an axial bore with a downwardly facing shoulder and an upwardly facing seat located above the shoulder;
- a female check valve member carried in the bore of each female connector, for movement between a closed position in contact with the seat to prevent flow of hydraulic fluid through the female connector bore, to an open position away from the seat, allowing flow of fluid through the female connector bore;
- spring means for urging the female check valve member into the closed position;
- a resilient metal seal ring having a pair of inwardly facing lips carried directly below the shoulder;
- an elastomeric seal located below the metal seal ring;
- a male support member adapted to be mounted to a subsea well apparatus;
- a plurality of male connectors mounted to the upper side of the male support member and facing upwardly, each male connector including a mandrel having a bore therethrough for the passage of hydraulic fluid, the bore having an upwardly facing seat, the mandrel adpated to be received within the housing and having an upper end adapted to contact and axially deflect the seal ring;
- a male check valve member carried in the mandrel bore of each male connector for movement between a closed position in contact with the seat in the mandrel bore to prevent flow of hydraulic fluid, to an open position in contact with the female check valve member and spaced from the mandrel bore seat, allowing flow of fluid through the mandrel bore;
- spring means for urging the male check valve member into the closed position;
- bias means for urging the upper end of the mandrel against the seal ring, the bias means comprising a plurality of frusto-conical washers mounted with opposed apexes between one of the connectors and its support member, so that when the support members are moved together, the frusto-conical washers will deflect and apply a force to maintain the upper end of the mandrel tightly against the seal ring; and
- latch means for latching the support members together with the connectors engaging each other.

* * * * *